Patented May 19, 1953

2,639,284

UNITED STATES PATENT OFFICE 2,639,284

PROCESS OF PREPARING MONOMETHYL PIPERAZINES

Henri Morren, Forest-Brussels, Belgium

No Drawing. Application November 25, 1950, Serial No. 197,633. In Belgium November 25, 1949

6 Claims. (Cl. 260—268)

The present invention relates to a process of preparing N-monomethylpiperazine which is of great importance on account of the fact that it is used for the preparation of synthetic products having valuable therapeutical properties. The methods known hitherto of obtaining N-monoalkylpiperazines are however complicated and require a long sequence of operations. Thus the methods disclosed by Moore, Boyle and Thorn (J. Chem. Soc. London 1929 39–51 and by Baltzly, Buck, Lorz and Schoen (J. Am. Chem. Soc. 66 (1944) 263–66) are based on the principle of protecting one of the imine functions of piperazine by substitution, alkylating the other and finally restoring the first. Furthermore, synthesis published by Prelog and Stepan (Coll. Trav. Chim. Tchecosl. 7 (1935) 93–102), starting from an alkylamine and ethylene oxide is complicated and also dangerous owing to the fact that it involves the temporary formation of substances having extremely violent vesicant properties. All these methods are therefore hardly suitable for industrial manufacture.

The object of the present invention is to prepare N-monomethylpiperazine from piperazine in a simple manner and with a very high yield. The process is based on the surprising discovery of the fact that polymerisation products obtained by reaction between piperazine and an aldehyde are decomposed into N-monoalkylpiperazine by hydrogenation. The reaction between the piperazine and an aldehyde with formation of polymerisation products is known and has been described in several publications, especially by Rodalsky (J. Prakt. Chem. /2/ 53 (1896) 22), Ladenburg and Herz (Ber. Dtsch. Chem. Ges. 30 (1897) 3043–45), Van Dorp (Rec. Trav. Chim. Pays-Bas 28 (1909) 68–91) and Forsee and Pollard (J. Am. Chem. Soc. 57 (1935) 2363–64). These latter have defined the polymerised compounds as being:

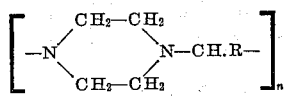

wherein R=H or an alkyl. The products of this type are referred to in the following description, as polyalkylenepiperazines. As regards more particularly the product obtained by reaction between piperazine and formaldehyde, (which product corresponds to the above formula where R=H) this will be referred to as polymethylenepiperazine.

The polyalkylenepiperazines are little soluble in almost all solvents. It could not at all be foreseen that under the action of hydrogenolysis they would be converted with a high yield in derivatives monosubstituted on the nitrogen of the piperazine. Considering the propensity of piperazine to form NN'-disubstituted derivatives, it was in fact to be expected that products such as

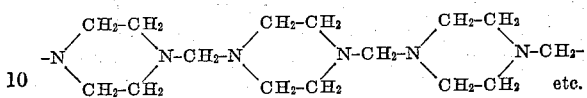

would be decomposed by hydrogenation into a mixture containing mainly NN'-dimethylpiperazines.

The reduction of the polymer compound can be effected at atmospheric temperature or at a higher temperature, for example at the boiling temperature of the liquid (water or organic solvents miscible with water) within which the compound of polymethylenepiperazine was formed. Depending upon the choice of the reducing agent, it may be found of advantage to carry out reduction in some cases at the temperature of melting ice.

I have found that for hydrogenolysis there may be used any of the usual means. As such may be mentioned molecular hydrogen at atmospheric or higher pressure in the presence of catalysts such as for example Raney nickel or copper chromite, but there may be used nascent hydrogen from zinc and an acid or from Raney alloy and caustic alkali or obtained from formic acid.

From the hydrogenolysis of the polymethylenepiperazine there results a mixture containing chiefly N-monomethylpiperazine besides small quantities of piperazine, dimethylpiperazine and, may be, some of the undecomposed starting products. This mixture may often be used directly for synthesis processes starting from N-monomethylpiperazine, the by-products of hydrogenolysis taking no part in these processes or being capable of subsequent separation in a very simple manner. In order to isolate the N-monomethylpiperazine from the mixture, it is generally more advantageous to treat same with carbon disulphide. This latter is able to form crystallized addition compounds with the substances which still contain at least one imine function. It is thus possible to separate from the mixture the N-monomethylpiperazine and the piperazine. Their addition compounds with carbon disulphide are subjected to hydrolysis by hydrochloric acid; the carbon disulphide is recovered by distillation and the mixture of N-monomethylpiperazine and piperazine is collected in the form of their dihydrochlorides. The latter are in turn separated by taking advantage of the fact that the N-monomethylpiperazine dihydrochloride is soluble in boiling methanol, whereas the piperazine dihydrochloride is little soluble.

I may also isolate the N-monomethylpiperazine from the mixture of the hydrogenolysis products by carrying off with steam after the solution has been made strongly alkaline, but this method requires a rather considerable consumption of steam and is only to be recommended in some special cases.

When the mixture resulting from the hydrogenolysis contains only very little dimethylated product, it is possible to do away with the treatment with carbon disulphide and merely to separate the N-monomethylpiperazine from the piperazine by means of boiling methanol as above described.

In order to free the N-monomethylpiperazine from its dihydrochloride, there may be used any of the known methods: either by a dry treatment with lime or by a treatment with concentrated alkali solutions, or again with an alkali metal alcoholate. In the latter case the alkali metal chloride formed may be separated by filtration and the solvent may be distilled from the filtrate to obtain the free base or the filtrate may be directly used to react the N-monomethylpiperazine with other substances.

Example 1

In a large gas washing bottle fitted with a fritted glass plate surmounted with a condenser and connected to a supply of hydrogen gas opening under the plate of fritted glass, pour a solution of 194 gr. of piperazine hexahydrate in one liter of normal butyl alcohol; heat to about 50-60° C. while blowing hydrogen to stir the mass.

Then pour 87 gr. of an aqueous 34.5% solution of formaldehyde. Very soon the methylenic polymer of piperazine appears in form of a white suspension in the butanol, the whole taking up a thicker consistency; add to the mass about 5 gr. of Raney nickel and continue blowing hydrogen while heating the whole to the boiling point of the mixture. The rate of flow of hydrogen is about 25 liters per hour. The hydrogenation progresses rapidly, the mass of greyish appearance and thick consistency becomes more and more fluid and dark, the nickel being more visible owing to the disappearance of the methylenic compound. After blowing hydrogen for 2½ h., the operation is stopped, the apparatus is allowed to cool and the Raney nickel is filtered.

The filtrate is stirred and treated for 10 minutes with 90 gr. of carbon disulphide. A crystalline precipitate is formed, which is separated from the liquid by filtration. The wet precipitate is directly treated with 300 c. c. of concentrated hydrochloric acid; heating the reflux is applied and then the regenerated carbon disulphide is distilled off.

The remaining mass is evaporated to dryness in vacuo. The resulting dry product is a mixture of methylpiperazine dihydrochloride and piperazine dihydrochloride weighing about 161 gr.

I boil with reflux these 161 gr. of dihydrochlorides with 400 cc. of methanol. The methylpiperazine dihydrochloride is dissolved. I filter at boiling point the piperazine dihydrochloride which is hardly soluble. After drying at 110° C., the filtered product weighs about 10 gr. The filtrate is evaporated to dryness, to constant weight, there remaining about 146 gr. of monomethylpiperazine dihydrochloride which already is of great purity. This corresponds to a yield of about 85%.

In order to convert the monomethylpiperazine dihydrochloride into a free base, it is suspended in 170 cc. of methanol, I then add, while stirring, a solution of 39 gr. of sodium in 500 cc. of methanol and, after cooling, I separate by filtration the sodium chloride formed. I thus obtain a methanolic solution of the N-monomethylpiperazine which may be used for further synthesis, or for isolating the monomethylpiperazine by distillation of the methanol.

Example 2

The steps described in Example 1 may be repeated with other alcohols than normal butanol. Thus methanol, ethanol, propanol, isopropanol, isobutanol, and the pentanols are quite suitable. The only difference observed is a variation in the rate of hydrogenolysis which seems to depend on the temperature of the test and accordingly, if operating at atmospheric pressure, of the boiling temperature of the solvent used.

While keeping conditions identical with the test as described in Example 1, except for the alcohol used, I may obtain for example the same yield as that indicated above, in about 10 hours with ethanol, about 3½ h. with isobutanol and in 2 h. with normal pentanol, etc.

Some other solvents such as dioxane or glycol may be suitable for effecting this hydrogenolysis, but in that case, the operation always takes more time and the yields are less satisfactory.

Example 3

Dissolve 194 gr. of piperazine hexahydrate in 1200 cc. of dioxane, heat the solution to about 40° C. and add while stirring 87 gr. of 34.5% formaldehyde. To the mass which has become very thick, add about 25 gr. of Raney nickel and pour the mass into a gas washing bottle with porous plate. Hydrogen is blown while the dioxane is heated under reflux. After 11 hours the reduction is substantially terminated. The nickel is filtered and the filtrate is treated with 100 gr. of carbon disulphide. 128 gr. of addition product is separated and the process is continued as described in the preceding examples.

Example 4

The same yields as those obtained in Example 1 may be obtained by hydrogenolysis under pressure. Thus a yield of about 87% methylpiperazine dihydrochloride is obtained by hydrogenating the polymethylenepiperazine, prepared in a rotary pressure vessel of V2A steel from 194 gr. piperazinehexahydrate and 87 gr. of 34.5% formaldehyde in 650 cc. of ethanol in the presence of 7 gr. Raney nickel and hydrogen at a pressure of about 100 kgr./sq. cm. the temperature being from 100 to 110° C. and the time from 4 to 5 hours.

Example 5

194 gr. piperazine hexahydrate is dissolved in 650 cc. butanol and 87 gr. of 34.5% formaldehyde solution is added while thoroughly stirring at about 40° C. The temperature rises and polymethylenepiperazine is formed. 20 gr. copper chromite is dispersed in the mass and the whole is transferred to a rotary pressure vessel. Hydrogen under pressure of 100 to 150 kgr./sq. cm. is introduced and the temperature is raised. Towards 160° C. absorption of hydrogen takes place. The pressure vessel may be recharged and the temperature is raised to 200° C. for 2 hours. After cooling and filtering the catalyst, the treatment is continued as indicated in Example 1. There is obtained 113.5 gr. of methylpiperazine dihydrochloride.

*Example 6*

194 gr. piperazinehexahydrate is dissolved in 1200 cc. water at about 40° C. and there is added with stirring 87 gr. 34.5% formaldehyde. The temperature rises and the polymethylenepiperazine precipitates. The suspension is cooled towards 0° C. and 165 gr. zinc powder is added; there is then added slowly and without exceeding 0° C., 375 cc. concentrated hydrochloric acid diluted in 750 cc. water. Stirring is kept up for a night.

The mass is then strongly alkalised with sodium hydroxide and subjected to carrying off with steam. The distillate is acidified with hydrochloric acid and evaporated to dryness. There is thus obtained 131.5 gr. practically pure methylpiperazine dihydrochloride.

*Example 7*

86 gr. dry polymethylene piperazine is suspended in 1200 cc. toluene and stirred mechanically. The suspension is heated for about 15 minutes at 100° C., then cooled to about 30° C. 400 cc. formic acid at 82% is then added in small amounts without the temperature exceeding 70° C. The rate of addition of formic acid is controlled by the rate of evolution of the carbon dioxide formed. When this formation has ceased, the mass is brought to boiling point for one hour. The toluene and the excess of formic acid are evaporated in vacuo, the sirupy residue is treated twice with 500 cc. concentrated hydrochloric acid, and then evaporated to dryness.

The mass is treated by 500 cc. methanol at boiling point and filtered while hot. The piperazine dihydrochloride formed is thus separated. By crystallizing the filtrate, practically pure methylpiperazine dihydrochloride is obtained.

I claim:

1. A process of making N-monomethylpiperazine which comprises reacting piperazine with formaldehyde, thereby forming polymethylenepiperazine, subjecting said polymethylenepiperazine to hydrogenolysis, thereby forming N-monomethylpiperazine, and separating said N-monomethylpiperazine from the reaction mixture.

2. A process of making N-monomethylpiperazine which comprises reacting piperazine with formaldehyde, thereby forming polymethylenepiperazine, subjecting said polymethylenepiperazine to hydrogenolysis by reaction with molecular hydrogen in the presence of a catalyst, thereby forming N-monomethylpiperazine, and separating said N-monomethylpiperazine from the reaction mixture.

3. A process of making N-monomethylpiperazine which comprises reacting piperazine with formaldehyde, thereby forming polymethylenepiperazine, subjecting said polymethylenepiperazine to hydrogenolysis by reaction with nascent hydrogen, thereby forming N-monomethylpiperazine, and separating said N-monomethylpiperazine from the reaction mixture.

4. A process of making N-monomethylpiperazine which comprises reacting piperazine with formaldehyde, thereby forming polymethylenepiperazine, subjecting said polymethylenepiperazine to hydrogenolysis in an aqueous medium, thereby forming N-monomethylpiperazine, and separating said N-monomethylpiperazine from the reaction mixture.

5. A process of making N-monomethylpiperazine which comprises reacting piperazine with formaldehyde, thereby forming polymethylenepiperazine, subjecting said polymethylenepiperazine to hydrogenolysis in the presence of a water-miscible organic solvent, thereby forming N-monomethylpiperazine, and separating said N-monomethylpiperazine from the reaction mixture.

6. A process of preparing N-monomethylpiperazine which comprises reacting piperazine with formaldehyde, thereby forming polymethylenepiperazine, subjecting said polymethylenepiperazine to hydrogenolysis, thereby forming a mixture comprising a major proportion of N-monomethylpiperazine and a lesser proportion of piperazine and NN'-dimethylpiperazine, treating said mixture with carbon disulphide to form crystalline carbon disulphide addition compounds with the N-monomethylpiperazine and the piperazine, separating said addition compounds, hydrolyzing said addition compounds with hydrochloric acid, thereby forming N-monomethylpiperazine - dihydrochloride and piperazine-dihydrochloride, treating said dihydrochlorides with boiling methanol to dissolve the N-monomethylpiperazine-dihydrochloride, separating the piperazine-dihydrochloride from the solution, recovering the N-monomethylpiperazine-dihydrochloride from the solution, and converting the N-monomethylpiperazine dihydrochloride into free N-monomethylpiperazine by treatment with an alkali metal alcoholate.

HENRI MORREN.

No references cited.